United States Patent [19]

Sasaki et al.

[11] Patent Number: 4,860,136
[45] Date of Patent: Aug. 22, 1989

[54] ROTARY MAGNETIC DISC DEVICE WITH IMPROVED DISC PACK POSITIONING STRUCTURE

[75] Inventors: Hidemi Sasaki, Tokyo; Naoki Kobayashi, Omiya, both of Japan

[73] Assignee: Fuji Photo Film Co., Ltd., Kanagawa, Japan

[21] Appl. No.: 71,239

[22] Filed: Jul. 9, 1987

[30] Foreign Application Priority Data

Jul. 9, 1986 [JP] Japan .................. 61-161686
Oct. 29, 1986 [JP] Japan .................. 61-257656

[51] Int. Cl.$^4$ ........................................ G11B 5/016
[52] U.S. Cl. ........................... 360/99.05; 360/99.02
[58] Field of Search .............. 360/97, 99, 133, 86, 360/99.05, 99.02

[56] References Cited

U.S. PATENT DOCUMENTS

| | | | |
|---|---|---|---|
| 4,686,594 | 8/1987 | Kurafuji | 360/99 |
| 4,694,362 | 9/1987 | Oosaka et al. | 360/97 |
| 4,694,364 | 9/1987 | Matsuda et al. | 360/99 |
| 4,703,373 | 10/1987 | Oosaka | 360/99 X |
| 4,709,282 | 11/1987 | Tamada | 360/99 X |
| 4,710,831 | 12/1987 | Nishimura | 360/99 |
| 4,731,920 | 3/1988 | Nishijima et al. | 29/603 |

FOREIGN PATENT DOCUMENTS

| | | | |
|---|---|---|---|
| 3415412 | 12/1984 | Fed. Rep. of Germany | 360/97 |
| 0157069 | 4/1980 | Japan | 360/97 |
| 0072880 | 4/1984 | Japan | 360/97 |
| 0109058 | 6/1985 | Japan | 360/97 |
| 0164956 | 8/1985 | Japan | 360/97 |

Primary Examiner—Robert S. Tupper
Assistant Examiner—Andrew L. Sniezek
Attorney, Agent, or Firm—Sughrue, Mion, Zinn, Macpeak & Seas

[57] ABSTRACT

A rotary magnetic disc device suitable for use in a magnetic recording/reproducing apparatus in an electronic still camera or the like. In the rotary magnetic disc device, there are provided three height positioning pins which are used to set a regulation plate at a predetermined recording/reproducing position opposite to a magnetic head with a magnetic disc therebetween, and two of the height positioning pins are located in the neighborhood of an axis of rotation of a cover on which a regulation plate holder is resiliently supported, the positioning pins being located at a predetermined distance from each other. The improved arrangement of the positioning pins contributes to reduction of not only the size of the regulation plate holder but also an operation force necessary to operate the cover when closing it.

16 Claims, 11 Drawing Sheets

ROTARY MAGNETIC DISC DEVICE WITH IMPROVED DISC PACK POSITIONING STRUCTURE

BACKGROUND OF THE INVENTION

1. Field of the Invention

The present invention relates to a rotary magnetic disc device and, in particular, to a rotary magnetic disc device which is suitable for use in a magnetic recording-/reproducing apparatus in an electronic still camera or the like.

2. Description of the Prior Art

Recently, there has been developed an attractive electronic still camera system in which an image pickup device such as a solid image pickup element, an image pickup tube or the like is combined with a recording device. The recording device employs as a recording medium thereof an inexpensive magnetic disc having a relatively large storage capacity such that an object can be still photographed electronically and recorded on a rotating magnetic disc and the reproduction of the recorded image can be performed by means of a television system, a printer or the like which is provided separately from the electronic still camera system.

The magnetic disc that is used in such a camera system is usually in the form of a magnetic disc pack. In the magnetic disc pack there is rotatably stored a magnetic disc which is capable of magnetic recording of still image information or the like, and such magnetic disc pack is used after it is mounted to a rotary magnetic disc device which is incorporated in an electronic camera.

When the magnetic disc pack is mounted to the magnetic recording or reproducing apparatus in the electronic camera, it is troublesome and inconvenient to directly mount or locate a a central bore, which is formed in center core disposed in the central portion of the magnetic disc within the magnetic disc pack, onto a rotary drive shaft which is positioned on the side of the magnetic recording or reproducing apparatus. For this reason, such locating operation may result in the inaccurate mounting of the magnetic disc pack to the magnetic recording or reproducing apparatus.

In order to eliminate the above-mentioned problem, conventionally, there has been proposed a magnetic disc pack loading/unloading device which comprises a cover supported to the main body of the magnetic recording or reproducing apparatus such that it can be freely opened or closed, and a pack holder which can be operated cooperatively with the cover and in which the magnetic disc pack can be stored. In the magnetic disc pack loading/unloading device, by closing the cover after insertion of the magnetic disc pack into the pack holder, a magnetic disc in the magnetic disc pack within the pack holder can be mounted to the rotary drive shaft of the main body of the magnetic recording or reproducing apparatus.

In the above-mentioned magnetic disc pack loading-/unloading device, there is provided a regulation plate on the opposite side of a magnetic head in order to locate the magnetic disc along the magnetic head during the magnetic recording or reproducing operation. This regulation plate is attached to a regulation plate holder provided in the cover so that it is spaced apart from the magnetic head when the cover is open while it is located at a position to face the magnetic head when the cover is closed. Such regulation plate must be defined accurately in the height and plane position thereof, and, therefore, there are erected from the side of the main body of the magnetic recording or reproducing apparatus height positioning pins for the regulation plate holder as well as plane position positioning pins for the regulation plate holder. These positioning pins can be brought into contact with the regulation plate holder or can be inserted into their corresponding positioning holes formed in the regulation plate holder, when the cover is closed, so as to determine the height and the position of the regulation plate holder accurately.

The above-mentioned regulation plate holder is formed larger in size than the magnetic disc pack and, as the height positioning pins thereof, there are provided a total of three pins arranged on the right and left of the magnetic disc pack (specifically, two pins on the recording/reproducing side of the magnetic disc pack and one on the opposite side thereof). Also, these three height positioning pins are adapted such that they are completely apart from the regulation plate holder when the cover is in the open state thereof.

As described above, the regulation plate holder used in the conventional rotary magnetic disc device is larger in size and the height positioning pins are long spaced from one another, which requires a higher rigidity, and thus the weight of the whole device is increased accordingly.

Also, due to the fact that the regulation plate holder is adapted such that it completely parts from the three height positioning pins, the regulation plate holder becomes loose too much. Further, when the cover is closed, after the regulation plate holder is brought into contact with the three height positioning pins, all of springs for energizing the regulation plate holder, which are located between the cover and the regulation plate holder correspondingly to the respective height positioning pins must be compressed. As a result of this, a great operation force is required to close the cover and when the cover is to be opened, the great operation force acts as a reaction force so that a large-size damper must be mounted.

SUMMARY OF THE INVENTION

The present invention aims at eliminating the drawbacks found in the above-mentioned conventional device.

Accordingly, it is an object of the invention to provide a rotary magnetic disc device which is capable of reducing the size of a regulation plate holder as well as capable of reducing an operation force to close a cover.

It is another object of the invention to provide a rotary magnetic disc device in which a magnetic disc pack can be easily detached from positioning pins without increasing the degree of opening of the cover.

In order to accomplish the above objects, according to one aspect of the invention, there is provided a rotary magnetic disc device in which a magnetic disc pack is positioned in the main body of the device, a magnetic disc rotatably stored within the magnetic disc pack is rotated, a magnetic head is brought into contact with the magnetic disc and a regulation plate is set at a predetermined recording/reproducing position which is opposite to the magnetic head with the magnetic disc therebetween, whereby information can be magnetically recorded into or reproduced from the magnetic disc, the rotary magnetic disc device includes: a regulation plate holder to which the regulation plate is attached; a cover journaled, for rotation about a rotary shaft, to the device main body in a freely openable and closable manner and resiliently carrying the regulation plate holder; and three height positioning pins respectively erected on the device main body and engageable with the regulation plate holder for height positioning the regulation plate at a predetermined recording/reproducing position, two of the height positioning pins being respectively disposed adjacent to the axis of a rotary shaft of the cover at given intervals from each other.

Also, according to another aspect of the invention, the above-mentioned rotary magnetic disc device further includes: a pack holder structured so as to be able to store the magnetic disc pack therein, journaled such that it is free to open and close inside of the cover, and operable cooperatively with the cover; two positioning pins erected on the device main body and insertable into positioning holes formed in the magnetic disc pack for positioning the magnetic disc pack in the device main body; and, a removing member operable cooperatively with the cover when the cover is opened to push up the magnetic disc pack in the neighborhood of the positioning pins disposed on the rotary shaft side of the cover so as to be able to remove the magnetic disc pack from the positioning pins.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof wherein:

FIGS. 12 and 13 are respectively section views to show the operations of the rotary magnetic disc device: that is, FIG. 12 illustrates one state of the rotary magnetic disc device while the cover is open; and, FIG. 13 illustrates another state thereof while the cover is closed; and, FIG. 14 is a section view of another embodiment of a rotary magnetic disc device according to the invention.

DETAILED DESCRIPTION OF THE INVENTION

Detailed description will hereunder be given of the preferred embodiments of a rotary magnetic disc device according to the present invention with reference to the accompanying drawings.

Figure 1:
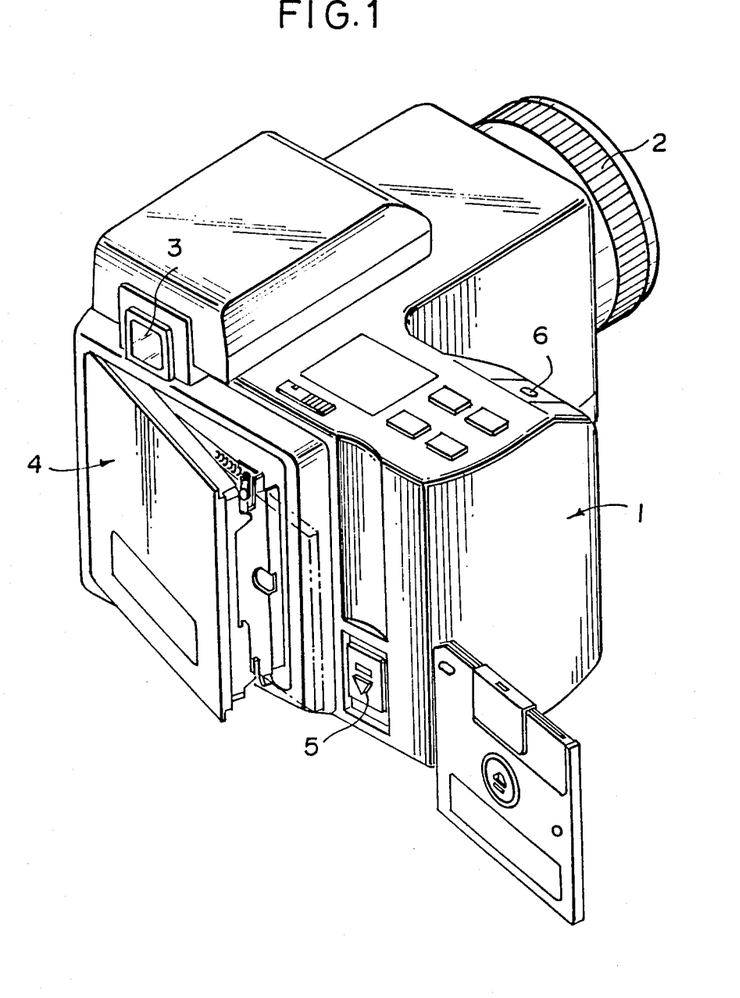
FIG. 1 is a perspective view of an external appearance of an electronic still camera to which the present invention is applied.

Referring first to FIG. 1, there is illustrated a general structure of an electronic still camera to which a rotary magnetic disc device of the invention is applied. In this figure, reference numeral 1 designates a camera body, 2 a photographing lens mount, 3 a finder, 4 a rotary magnetic disc device, 5 a knob for opening or closing a pack holder for the magnetic disc device, and 6 a shutter release button of the electronic still camera.

Next, the structure of a magnetic disc pack to be mounted onto the rotary magnetic disc device 4 will be described with reference to FIGS. 2 and 3.

Figure 2:
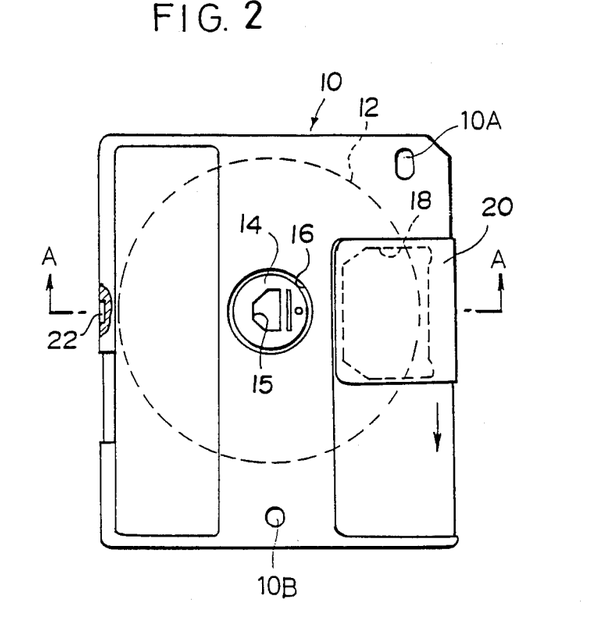
FIG. 2 is a plan view of a magnetic disc pack to be used in a magnetic recording/reproducing apparatus, with a rotary magnetic disc being shown in a dotted line.
Figure 3:
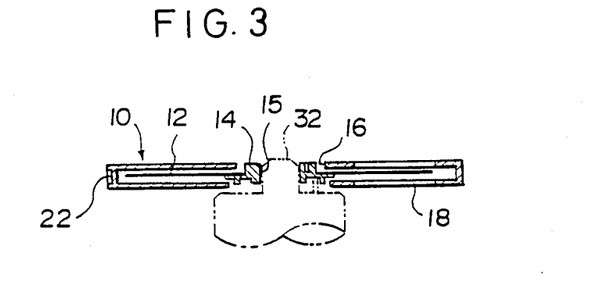
FIG. 3 is a section view taken along a line A—A in FIG. 2.

In FIG. 2, there is shown a plan view of the magnetic disc pack and, in FIG. 3, there is shown a section view of the magnetic disc pack taken along a line A—A in FIG. 2. As shown in FIG. 2, the magnetic disc pack 10 is formed in a substantailly square shape, and, within the square pack, there is rotatably stored a magnetic disc 12 into which still image information or the like can be recorded. In the central part of the magnetic disc 12 there is provided a center core 14 which serves as a reinforcing member. The center core 14 is exposed externally from a circular opening formed in the magnetic disc pack 10. In the magnetic disc pack 10 there is formed a window portion 18 in which a magnetic head is to be positioned, and the window portion 18 for a magnetic head can be opened or closed by means of a slidable shutter 20. That is, before the magnetic disc pack 10 is inserted into a pack holder 26, the shutter 20 closes the window portion 18 to prevent the magnetic disc 12 from being attached by dust. After the pack 10 is inserted into the pack holder 26, the shutter 20 moves in a downward direction in FIG. 2 to open the magnetic head window portion 18, permitting recording on or reproducing from the magnetic disc 12. In FIGS. 2 and 3, numeral 22 designates a recessed portion for provisionally engaging the magnetic disc pack 10 in a pack holder 26.

Referring now to FIGS. 4 through 7, there is shown the interior structure of the rotary magnetic disc device according to the invention and the illustrated embodiment comprises a main body of the rotary magnetic disc device 24, a pack holder 26 and a cover 28. At first, referring to the structure of the device main body 24 in connection with FIG. 5, within the device main body there is provided a motor 30 which is used to drive the magnetic disc. The magnetic disc drive motor 30 has a drive shaft 32 which is adapted such that it can be inserted through a central bore 15 (as shown in FIG. 3) formed in the center core 14 provided in the magnetic disc pack 10 to rotate the magnetic disc 12 at a given number of rotations within the magnetic disc pack 10. Also, in FIG. 5, reference numeral 34 designates a motor for feeding a mgnetic head, 36 a lead screw connected through gears 34A, 34B to the output shaft of the motor 34, 38 a head carriage which can be threadedly engaged with the lead screw 36 and also can be guided and moved by a guide shaft 40, and 42 a magnetic head provided on the head carriage 38. In such structure, therefore, if the motor 34 is rotated at every number of rotations, then the head carriage 38 is moved at every given pitch in the axial direction of the guide shaft 40 due to the rotation of the lead screw 36 and, as a result of this, the magnetic head 42 is moved in the radial direction of the magnetic disc 12 so as to be able to record or reproduce still image information into or from the magnetic disc 12, in particular, each of tracks formed in the magnetic disc 12.

Figure 6:
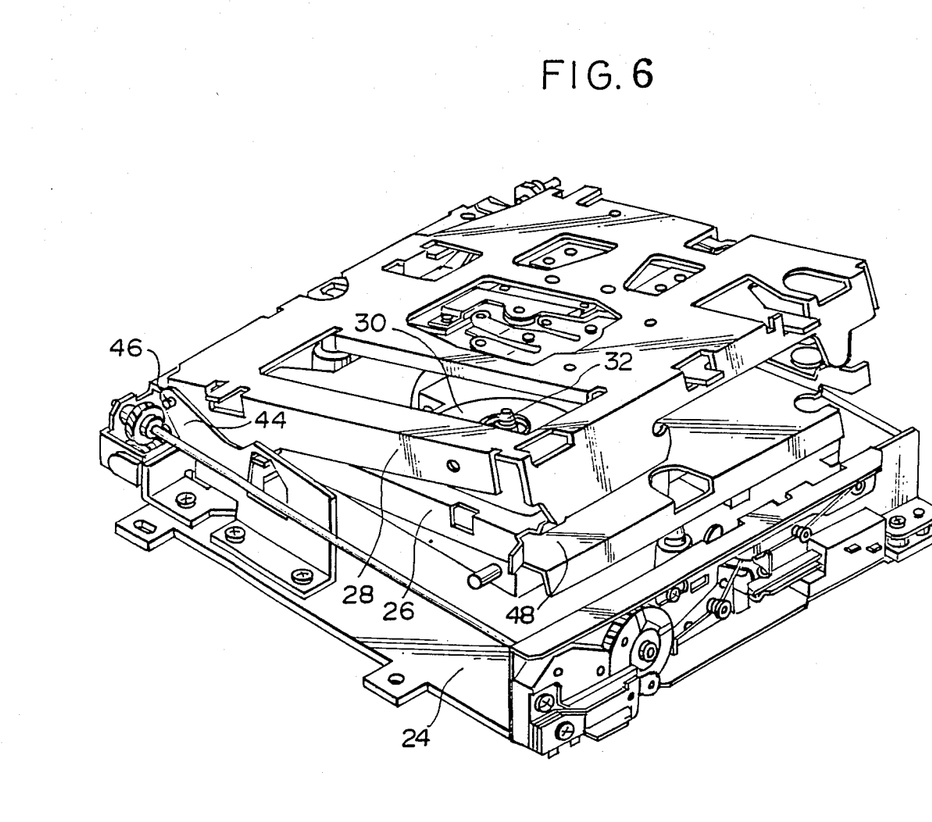
FIG. 6 is a perspective view of a cover and a pack holder.

In the end portions of the device main body 24 there are arranged brackets 44, 44 on which the cover 28 shown in FIG. 6 is pivotally supported via a pin 46. Also, the pack holder 26 is pivotally supported by the cover 28 via a pin 47. The pivotally supporting pin 47 for the pack holder 26 is located closer to the insertion opening side of the pack holder 26 than the pivotal support pin 46. Due to this, the degree of opening of the cover 28 can be reduced, which makes it possible to produce a thinner device and also which can prevent the invasion of a strange object and the like into the device more effectively. The cover 28 is being energized with respect to the device main body 24 in the opening direction thereof by a spring (not shown). Also, between the cover 28 and the pack holder 26, there is interposed another spring which is energizing the pack holder 26 in a direction to part the pack holder 26 from the cover 28. For this reason, as shown in FIG. 4, in the state where the cover 28 is open, the pack holder 26 is able to part from the the device main body 24 and the cover 28 to thereby open the magnetic disc pack insertion opening 48 of the pack holder 26.

Figure 4:
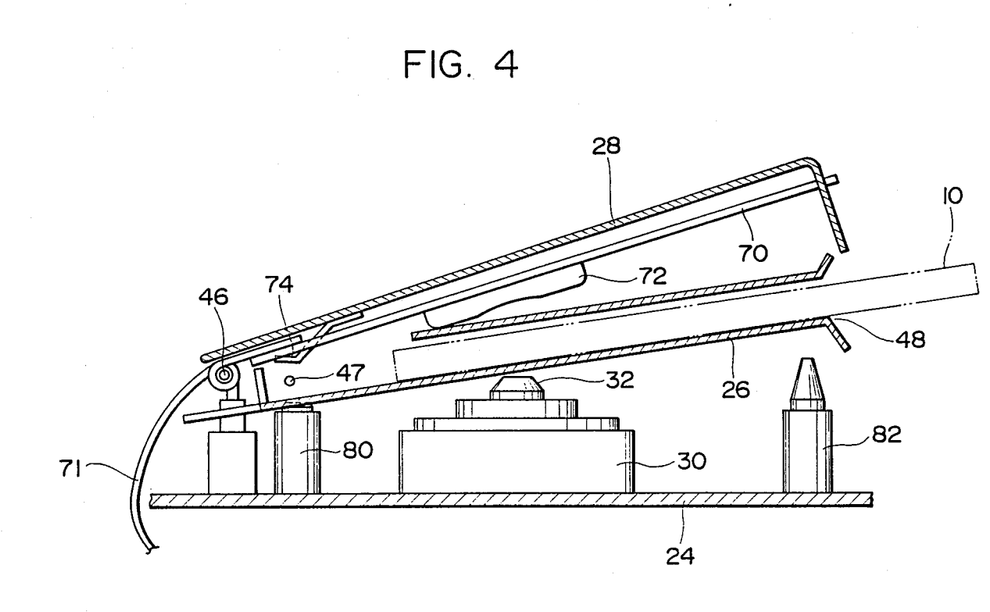
FIG. 4 is a section view of a rotary magnetic disc device to be used in the electronic still camera shown in FIG. 1, illustrating the state of the rotary magnetic disc device when the cover is open.
Figure 7:
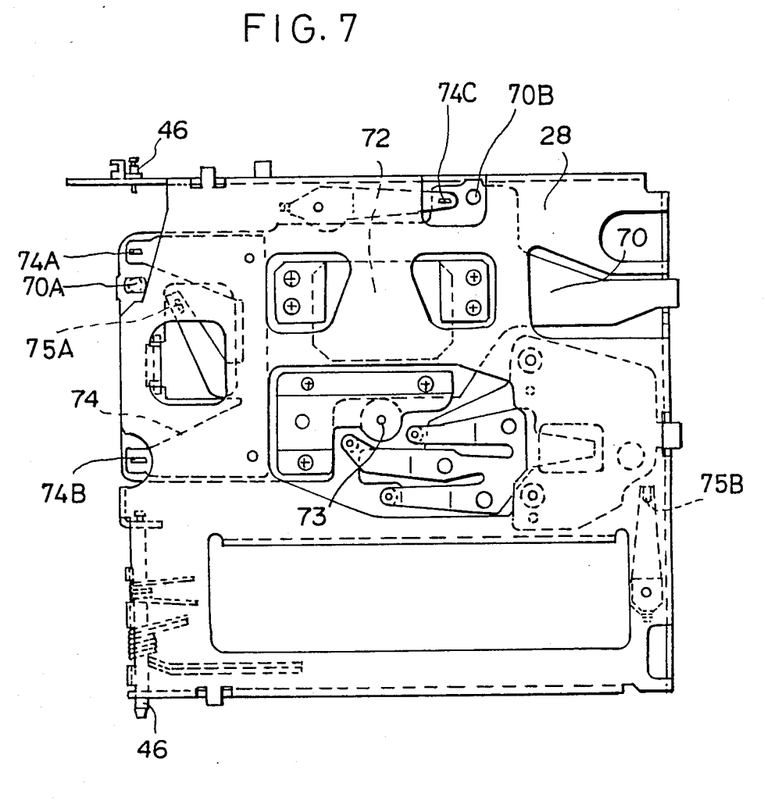
FIG. 7 is a plan view of the cover and the pack holder.

Also, as shown in FIGS. 4 and 7, on the back surface of the cover 28 there is arranged a regulation plate holder 70 which is provided with a regulation plate 72 for accomplishing stable contact between the magnetic disc 12 and the magnetic head 42. The regulation plate 72 is fixed to the regulation plate holder 70 such that it is opposed to the magnetic head 42 while the cover 28 is open. Also, on the back surface of the regulation holder 70 there are provided plate springs 74A, 74B, 74C for energizing (biasing) the regulation plate holder 70 and plate springs 75A, 75B for energizing (biasing) the magnetic disc pack 10.

Further, as shown in FIG. 4, when a lead wire 71 is lightly wound one time or more around the pin 46, a fulcrum or axis of rotation of the cover 28, and is connected thereto, then the stress that is applied to the lead wire 71 is reduced, so that in assembling the lead wire 71 will never be broken even if a tensile force is given to the lead wire 71. In such structure, without employing a flexible substrate or the like, a conventional single wire can be used to electrically connect a P.G coil 73 on the cover side with a control circuit on the main device side.

Figure 5:
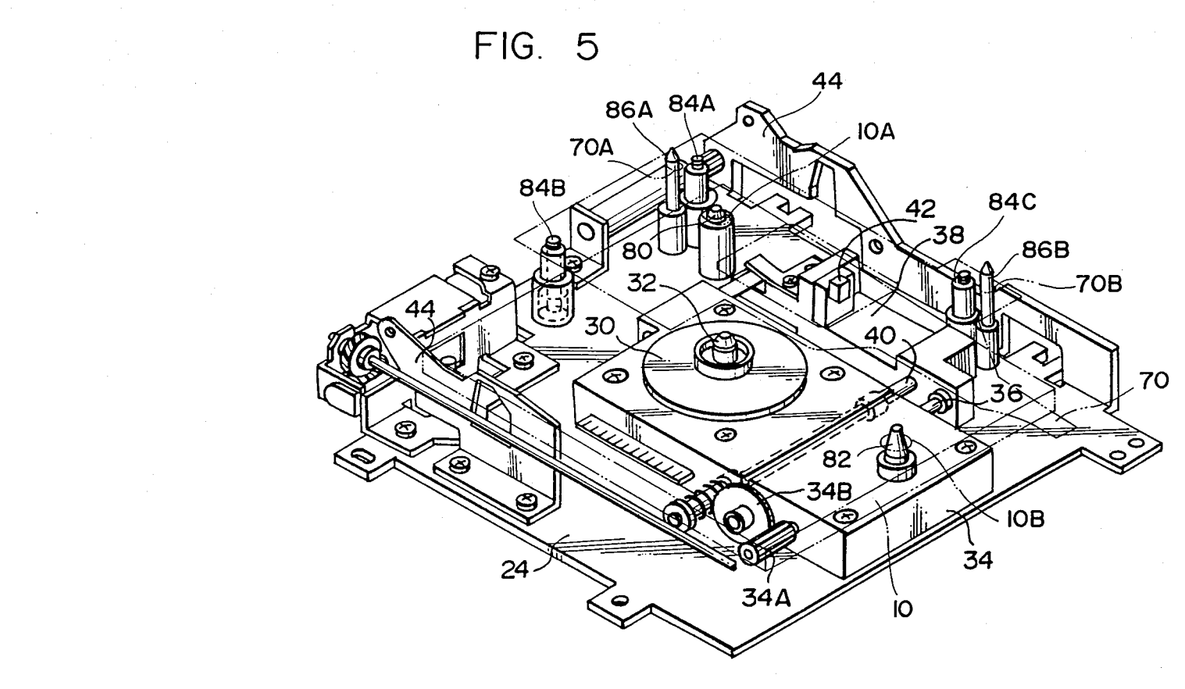
FIG. 5 is a perspective view of the internal structure of the rotary magnetic disc device.

As shown in FIG. 5, there are erected pins 80, 82 on the device main body 24, which are used to position the magnetic disc pack 10. The positioning pins 80, 82 are adapted such that, while the cover is closed, they can be engaged into positioning holes 10A, 10B formed in the magnetic disc pack 10 to thereby position the magnetic disc pack 10 at a predetermined position.

Also, there are erected on the device main body 24 pins 84A, 84B, 84C which are used to position the height of the regulation plate holder 70. Among them, the two pins 84A and 84B are located in the neighborhood of the axis of the shaft of rotation of the cover 28. Further, on the device main body 24 there are erected pins 86A and 86B which are used to position the plane of the regulation plate holder 70, and the pin 86A is located adjacent to the axis of the shaft of rotation of the cover 28.

It should be noted that the height positioning pins 84A, 84B are adapted to compress the plate springs 74A, 74B for energizing the regulation plate holder 70 so that they are normally in contact with the regulation plate holder 70, and also that the plane positioning pin 86A is normally inserted into a positioning hole 70A formed in the regulation plate holder 70.

The pack holder 26 is provided in the face thereof opposed to the device main body 24 with openings into which the drive or rotary shaft 32 provided in the device main body 24 as well as the magnetic head 42, positioning pins 80, 82 and the like similarly provided in the device main body 24 can be inserted, respectively.

Figure 8:
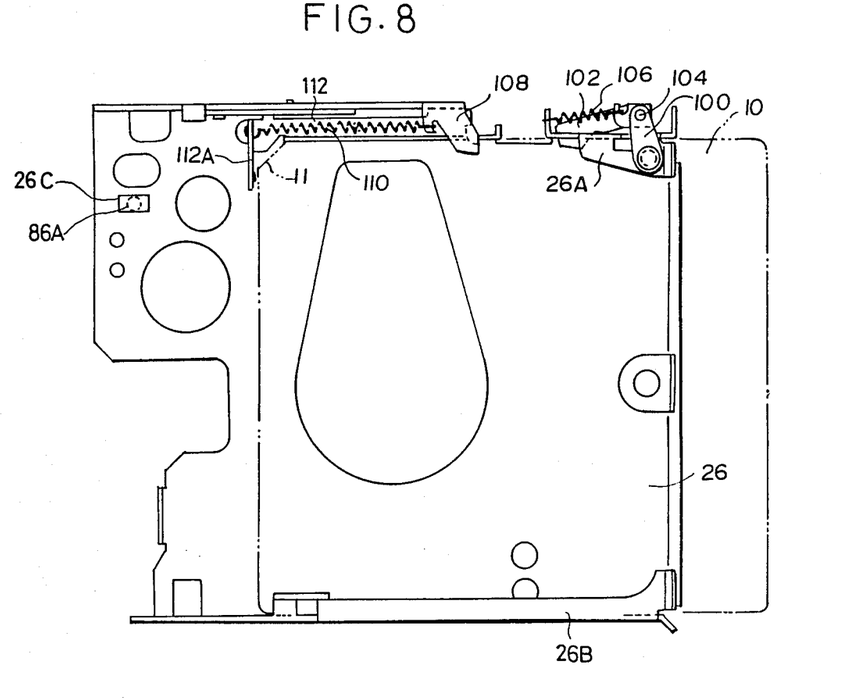
FIG. 8 is a plan view of the pack holder.

As shown in FIG. 8, the pack holder 26 has in the two side end portions thereof two curved, U-shaped portions 26A, 26B which can act as a guide for the magnetic disc pack 10 when the pack 10 is inserted into the pack holder 26. An arm 100 is fixedly secured to one side end portion 26A of the pack holder 26, and to the arm 100 there is connected a hold lever 102 which is energized by a spring 106 such that it is rotated about a pin 104 counterclockwise, that is, toward the side edge of the magnetic disc pack 10.

Also, on the side end portion 26A side of the pack holder 26, there is provided a shutter release member 108.

Figure 9:
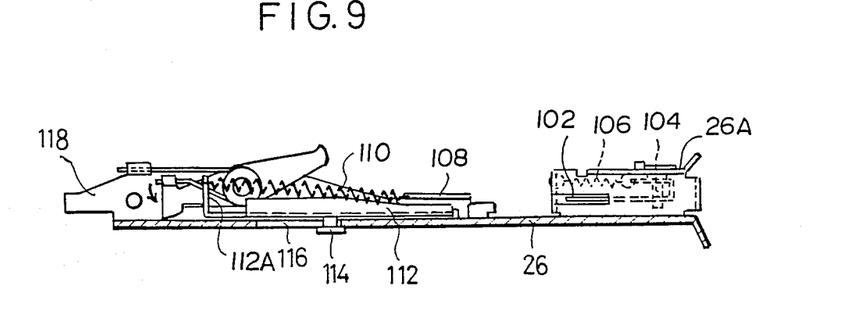
FIG. 9 is a section view of the pack holder.

A discharge plate 112 is mounted to the pack holder 26 through a pin 114 such that it can be slided freely in a direction to insert or discharge the magnetic disc pack 10. In other words, as shown in FIG. 9, the pack holder 26 is formed with a long groove 116 which extends in the insertion/discharge direction, and the pin 114 from the discharge plate 112 can be fitted into the long groove 116. When the pin 114 is inserted into the long groove 116, then the discharge plate 112 can be moved freely on the pack holder 26 in the magnetic disc pack insertion/discharge direction. Also, there is provided a spring 110 in the discharge plate 112 and the discharge plate 112 is energized by the spring 110 in the right direction in FIGS. 8 and 9, that is, in the discharge direction of the magnetic disc pack 10. The discharge plate 112 is also provided with an erect piece 112A and the magnetic disc pack 10 can be brought into contact with the erect piece 112A. In FIG. 8, the angular hole 26C in the pack holder 26 is always (both in the open and closed states of the cover) engaged with the plane positioning pin 86A of the regulation plate holder 70. As a result of this, there is eliminated a loose condition of the pack holder 26 in a direction to intersect with the magnetic disc pack insertion direction, that is, in the width direction of the pack, so that, when the pack is stored in the pack holder, there is eliminated a possibility of the pack running on the positioning pin 80 or the like.

The embodiment of a rotary magnetic disc device according to the present invention and structured in the above-mentioned manner can be operated as follows: At first, in the open state of the rotary magnetic disc device shown in FIG. 1, the magnetic disc pack 10 is inserted into the pack holder 26. When the magnetic disc pack 10 is inserted into the pack holder 26, the magnetic disc 10 is guided by the two side end portions of the pack holder 26 and inserted thereinto with the direction indicating surface 11 thereof being disposed in the upper left position in FIG. 8. Then, if the magnetic disc pack 10 is further inserted into the pack holder 26, the leading end surface of the magnetic disc pack 10 is abutted against the erect piece 112A of the discharge plate 112. In this state, if the magnetic disc pack 10 is inserted still further, then the discharge plate 112 is moved in the left direction in FIG. 8 against the energizing force of the spring 110, so that the magnetic disc pack 10 can be stored within the pack holder 26.

After the magnetic disc pack 10 is completely inserted into the pack holder 26, if the cover 28 is pressed down toward the device main body 24, then the center core 14 is mounted to the drive shaft 32, so that the magnetic disc 12 can be rotated by the drive shaft 32. Also, the positioning pins 80, 82 respectively erected on the device main body 24 are fitted into the positioning holes 10A, 10B in the magnetic disc pack 10, respectively. At the same time, the height positioning pin 84C for the regulation plate holder 70 is brought into contact with the lower surface of the regulation plate holder 70, and the plane positioning pin 86B for the regulation plate holder 70 is fitted into the positioning hole 70B in the regulation plate holder 70, whereby the height and plane position of the regulation plate holder 70 can be determined.

Since the height positioning pins 84A, 84B for the regulation plate holder 70 are located adjacent to the axis of the rotary shaft of the cover 28, it is possible to reduce the influences of the plate springs 74A, 74B for energizing the regulation plate holder 70 which are compressed by the height positioning pins 84A, 84B due to the action of the lever and fulcrum in the closed state of the cover, thereby minimizing the force to operate the cover 28.

Figure 10:
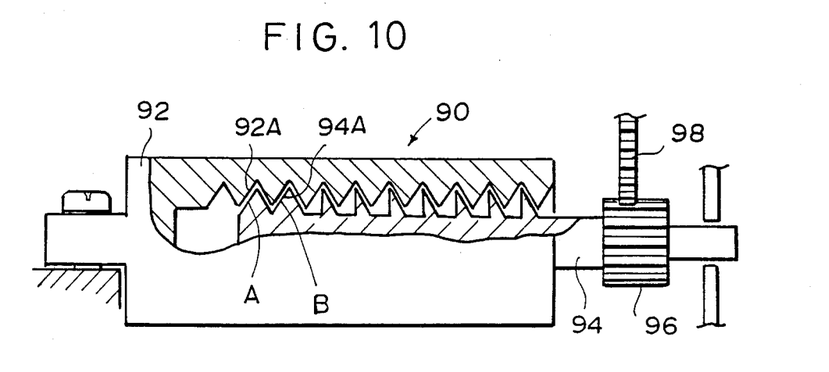
FIG. 10 is an explanatory view of a damping device in the pack holder.
Figure 11:
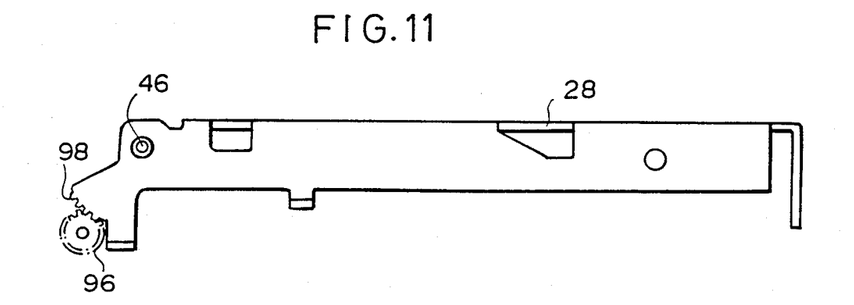
FIG. 11 is a side view of the cover.

Referring now to FIG. 10, there is shown a damping device which is capable of absorbing the shock forces of the regulation plate holder 70 produced when the holder 70 is opened or closed. In other words, the illustrated damper device 90 comprises an outer cylinder 92 and an inner cylinder 94. The outer cylinder 92 is formed with a female screw 92A and the inner cylinder 94 is formed with a male screw 94A. These threaded portions 92A, 94A are respectively shaped in the right-handed screw forms, and viscous grease is charged into the clearances produced between the two right-hand screws. The inner cylinder 94 is also provided with a gear 96 which is in engagement with another gear 98 provided in the cover 28 shown in FIG. 11.

In the damper device 90 for absorbing the shocks by the holder 70 structured in the above-mentioned manner, when the inner cylinder 94 is twisted clockwise, that is, when the regulation plate holder 70 is closed, the thrust forces are applied to all portions of the screw 94A to thereby reduce the size of the clearances, that is, to increase a damping effect, so that the holder shocks can be absorbed effectively. On the other hand, when the inner cylinder 94 is twisted counterclockwise, that is, when the regulation plate holder 70 is opened, the thrust forces may be applied only to the A and B portions of the screw 94A and, as a result of this, the clearances existing in the remaining portions of the screw 94A may be increased in size, so that the damping effect obtained is decreased.

Figure 12:
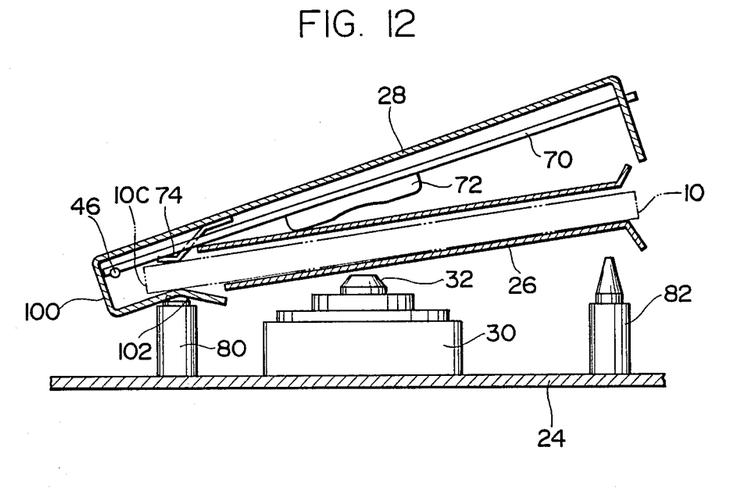
Figure 13:
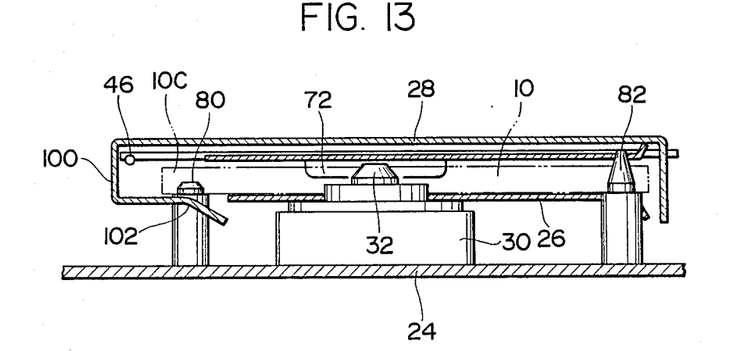

Referring now to FIGS. 12 and 13, there are shown the remaining important portions of the rotary magnetic disc device according to the present invention. In other words, the cover 28 includes an inner-most end portion 100 which is bent into a substantially U-shaped form. The bent inner-most end portion 100 is provided with a push-up piece 102 in the portion thereof corresponding to the back side of the cover 28. In the magnetically recording/reproducing state shown in FIG. 13, the push-up piece 102 stands apart from the magnetic disc pack 10. On the other hand, in the open state of the cover 28 shown in FIG. 12, the push-up piece 102 pushes the magnetic disc pack 10 upwardly, that is, the push-up piece 102 pushes up the magnetic disc pack 10 in such a direction that the magnetic disc pack 10 is caused to part away from the magnetic disc pack positioning pins 80, 82.

Referring next to the operation of the embodiment of the rotary magnetic disc device according to the invention structured in the above-mentioned manner, at first, in the open state of the cover 28 shown in FIG. 6, the magnetic disc pack 10 is inserted into the pack holder 26 and after then the cover 28 is closed, so that in the state as shown in FIG. 13 the magnetic recording or reproduction can be performed.

After the completion of the magnetic recording or reproducing operation, in order to take out the magnetic disc pack 10, the following operation is carried out. If the cover 28 is opened, then the magnetic disc pack 10 is pushed upwardly in FIGS. 12 and 13 by the push-up piece 102 provided in the cover 28, so that the magnetic disc pack 10 can be securely removed from the positioning pins 80, 82. That is, since in the operation to open the upper cover 28 the magnetic disc pack 10 is forcibly removed from the positioning pins 80, 82 by means of the push-up piece 102 in this manner, the magnetic disc pack 10 can be surely taken out from the pack holder 26.

Figure 14:
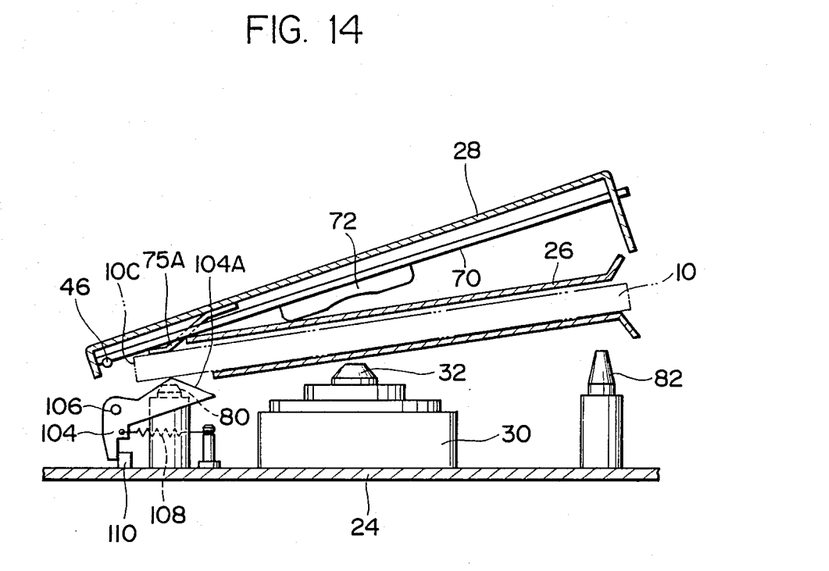
Figure 15:
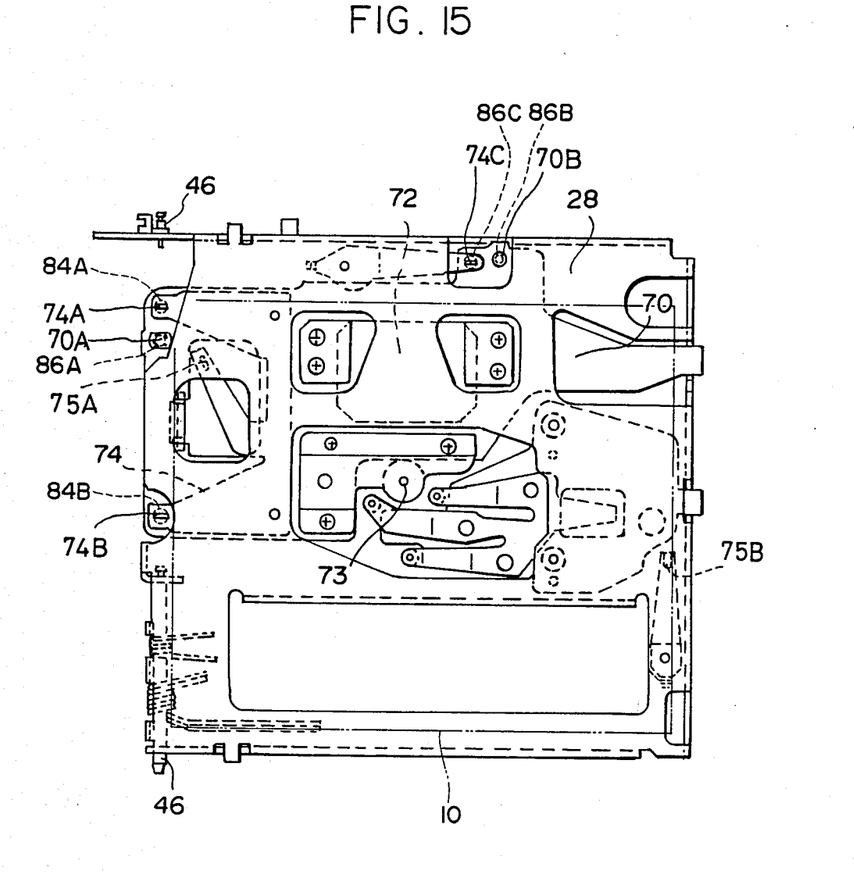

Referring now to FIG. 14, there is shown another embodiment of the rotary magnetic disc device according to the invention. In FIG. 14, the same or similar parts that have already been shown in the first embodiment shown in FIGS. 12 and 13 are given the same reference characters and the description thereof is omitted here. In the embodiment shown in FIG. 14, a push-up lever 104 is used instead of the above-mentioned push-up piece 102. That is, the push-up lever 104 is rotatably supported by a pin 106 and is also rotatively energized counterclockwise by a spring 108. The push-up lever 104 is in contact with a stopper 110 against the energization force of the spring 108 and thus it is situated at a position shown in FIG. 14. It should be noted here that the spring 40 is set lower in elasticity than the spring 104.

In the embodiment shown in FIG. 14, in a state where the magnetic disc pack 10 is inserted in the pack holder 26, if the cover 28 is pushed down, then the lever 104 is pushed down by the magnetic disc pack 10 and is rotated clockwise about the pin or shaft 106 against the energization force of the spring 108, so that the magnetic disc pack 10 can be positioned at a predetermined position by means of the positioning pins 80, 82. After the completion of the magnetic recording or reproducing operation, if the cover 28 is opened, then the pack holder 26 is also opened following the opening operation of the cover 28, when the lever 104 is rotated counterclockwise by means of the energization force of the spring 108 and the rear end portion 10C of the magnetic disc pack 10 is pushed up by the abutment portion 104A of the lever 104, so that the magnetic disc pack 10 can be completely removed from the positioning pins 80, 82.

In other words, in the second embodiment of the invention shown in FIG. 14, due to the fact that the magnetic disc pack 10 is forcibly removed from the positioning pins 80, 82 by the push-up lever 104, the magnetic disc pack 10, in the unloading operation thereof, can be removed completely from the pack holder 26.

As has been described heretofore, according to the rotary magnetic disc device of the invention, the locations of the height positioning pins for the regulation plate holder are improved, so that the size of the regulation plate holder can be reduced (almost to one half of the magnetic disc pack) and also the force to operate the cover can be reduced. Also, by making a part of the cover transparent, the label of the magnetic disc pack can be seen from outside. In addition, since the magnetic disc pack, in the unloading operation thereof, is forcibly removed from the pack positioning pins by a removal member, the degree of opening of the cover can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary magnetic disc device for at least one of magnetically recording on and reproducing from a magnetic disc by positioning a magnetic disc pack within a main body of said rotary magnetic disc device, rotating said magnetic disc which is rotatably stored within said magnetic disc pack, bringing a magnetic head into contact with said magnetic disc, and setting a regulation plate at a predetermined recording/reproducing position opposite to said magnetic head with the magnetic disc therebetween, wherein said rotary magnetic disc device comprises a regulation plate holder with said regulation plate mounted thereto, a rotary shaft, having an axis, mounted to said main body, a cover journaled to said device main body by being mounted on said rotary shaft for movement between an open position and a closed position and having means for resiliently holding said regulation plate holder, and three height position pins respectively erected on said device main body for limiting motion of said regulation plate holder so as to determine the height of said regulation plate at a predetermined recording/reproducing position when said cover is in said closed position, two of said three height positioning pins being located adjacent to the axis of the rotary shaft of said cover and at a predetermined distance from the other, wherein said disk pack has a front end disposed facing said rotary shaft when said disk pack is positioned in said main body, said two or said three height positioning pins are disposed in front of said front end of said disk pack when said disk pack is positioned in said main body with said cover in said closed position, and said two of said three height positioning pins and disposed at a distance from each other of less than a width of said disk pack measured in a direction parallel to said axis of said rotary shaft.

2. A rotary magnetic disc device as set forth in claim 1, wherein a width of said regulation plate holder is substantially one half of a width of said magnetic disc pack in a direction substantially parallel to the axis of said rotary shaft, said height positioning pins being disposed at a distance less than the width of said regulation plate holder with respect to said direction.

3. A rotary magnetic disc device as set forth in claim 1, wherein said means for resiliently holding comprises springs which, when said cover is in said closed position, bias said regulation plate holder and thereby bias said regulation plate, positioned by said three height positioning pins, substantially in a direction toward said magnetic head.

4. A rotary magnetic disc device as set forth in claim 3, wherein said two height positioning pins located adjacent to the axis of said rotary shaft of said cover compress said springs located upwardly thereof and thus are normally in contact with said regulation plate holder.

5. A rotary magnetic disc device as set forth in claim 1, wherein there are provided two plane positioning pins, respectively erected on said device main body, for engaging with respective means defining positioning holes in said regulation plate holder to prevent motion of said regulation plate within a plane so as to position said regulation plate at a predetermined position within the plane, one of said two plane positioning pins being located adjacent the axis of said rotary shaft of said cover.

6. A rotary magnetic disc device as set forth in claim 1, wherein there is provided a pack holder which is constructed in such a shape as to be able to hold said magnetic disc pack in a storage position therein, said pack holder being mounted to said cover for rotation about an axis distinct from the axis of said cover, means for causing said pack holder to rotate about its axis in response to rotation of said cover.

7. A rotary magnetic disc device as set forth in claim 5 wherein said plane positioning pin located adjacent the axis of said rotary shaft of said cover is adapted to extend through an elongated hole formed in said pack holder so that it is normally engaged with the respective one of said means defining positioning holes in said regulation plate holder.

8. A rotary magnetic disc device for at least one of magnetically recording on and reproducing from a magnetic disc by inserting a magnetic disk pack, which contains said magnetic disc, with its leading end first into a main body of said rotary magnetic device, positioning said magnetic disc pack within said main body, rotating said magnetic disc which is rotatably stored within said magnetic disc pack, bringing a magnetic head into contact with said magnetic disc, and setting a regulation plate at a predetermined recording/reproducing position opposite to said magnetic head with the magnetic disc therebetween, wherein said rotary magnetic disc device comprises a regulation plate holder with said regulation plate mounted thereto, a rotary shaft, having an axis, mounted to said main body, a cover mounted on said rotary shaft for rotation between an open position and a closed position and having means for resiliently holding said regulation plate holder, a pack holder constructed and shaped to hold therein said magnetic disc pack in a storage position, said pack holder being mounted to said cover for freely rotating between a first position and a second position when said cover is in said open position, first and second positioning pins respectively erected on said device main body and engageable in first and second positioning holes respectively formed in the leading and trailing ends of said magnetic disc pack to position said magnetic disc pack at a predetermined location within said device main body, and a removing member, responsive to movement of said cover from said closed position to said open position, for pushing up the leading end of said magnetic disc pack to thereby remove the engagement between said first positioning pin and said first positioning hole in said magnetic disk pack.

9. A rotary magnetic disc device as set forth in claim 8, wherein said cover has springs for biasing said pack holder toward said first and second positioning pins when said cover is closed.

10. A rotary magnetic disc device as set forth in claim 8, wherein said removing member is formed integrally with said cover and extends out to the lower surface of said magnetic disc pack in said storage position.

11. A rotary magnetic disc device as set forth in claim 9, wherein said removing member is a lever which is biased toward said disc pack by a spring weaker than said springs for biasing said pack holder, said lever pressing against the lower surface of said magnetic disc pack.

12. A rotary magnetic disc device for at least one of magnetically recording on and reproducing from a magnetic disc by positioning a magnetic disc pack within a main body of said rotary magnetic disc device, rotating said magnetic disc which is rotatably stored within said magnetic disc pack, bringing a magnetic head into contact with said magnetic disc, and setting a regulation plate at a predetermined recording/reproducing position opposite to said magnetic head with the magnetic disc therebetween, wherein said rotary magnetic disc device comprises a regulation plate holder with said regulation plate mounted thereto, a rotary shaft, having an axis, mounted to said main body, a cover mounted on said rotary shaft for rotation between an open and a closed position, and said cover having means for resiliently holding said regulation plate holder, a pack holder constructed and shaped for holding therein said magnetic disc pack in a storage position, said pack holder being rotatably mounted to said cover for freely rotating between a first position and a second position when said cover is in said open position, said pack holder being rotatably in response to rotation of said cover, two positioning pins respectively erected on said device main body and engageable in respective means defining positioning holes in said magnetic disc pack to position said magnetic disc pack in a predetermined position, in a plane, in said device main body, a removing member, responsive to movement of said cover from said closed position to said open position, for contacting said magnetic disc pack and pushing said disc pack away from said two positioning pins so as to remove said magnetic disc pack from said positioning pins, and three height positioning pins respectively erected on said device main body for contacting said regulation plate holder to position the height of said regulation plate at a predetermined recording/reproducing position, two of said three height positioning pins being located adjacent to the axis of the rotary shaft of said cover and at a predetermined distance from each other.

13. A rotary magnetic disc device as set forth in claim 8, wherein said removing member is disposed adjacent said rotary shaft.

14. A rotary magnetic disc device as set forth in claim 8, wherein said pack holder is mounted to said cover for rotation about an axis.

15. A rotary magnetic disc device as set forth in claim 14, wherein, when said cover is in said open position, said pack holder is rotatable to a position where said disc pack is removable therefrom.

16. A rotary magnetic disc device as set forth in claim 12, wherein said removing member is disposed adjacent said rotary shaft.

* * * * *